H. C. LEETE.
OIL REFINING APPARATUS.
APPLICATION FILED NOV. 24, 1917.
1,288,934.
Patented Dec. 24, 1918.
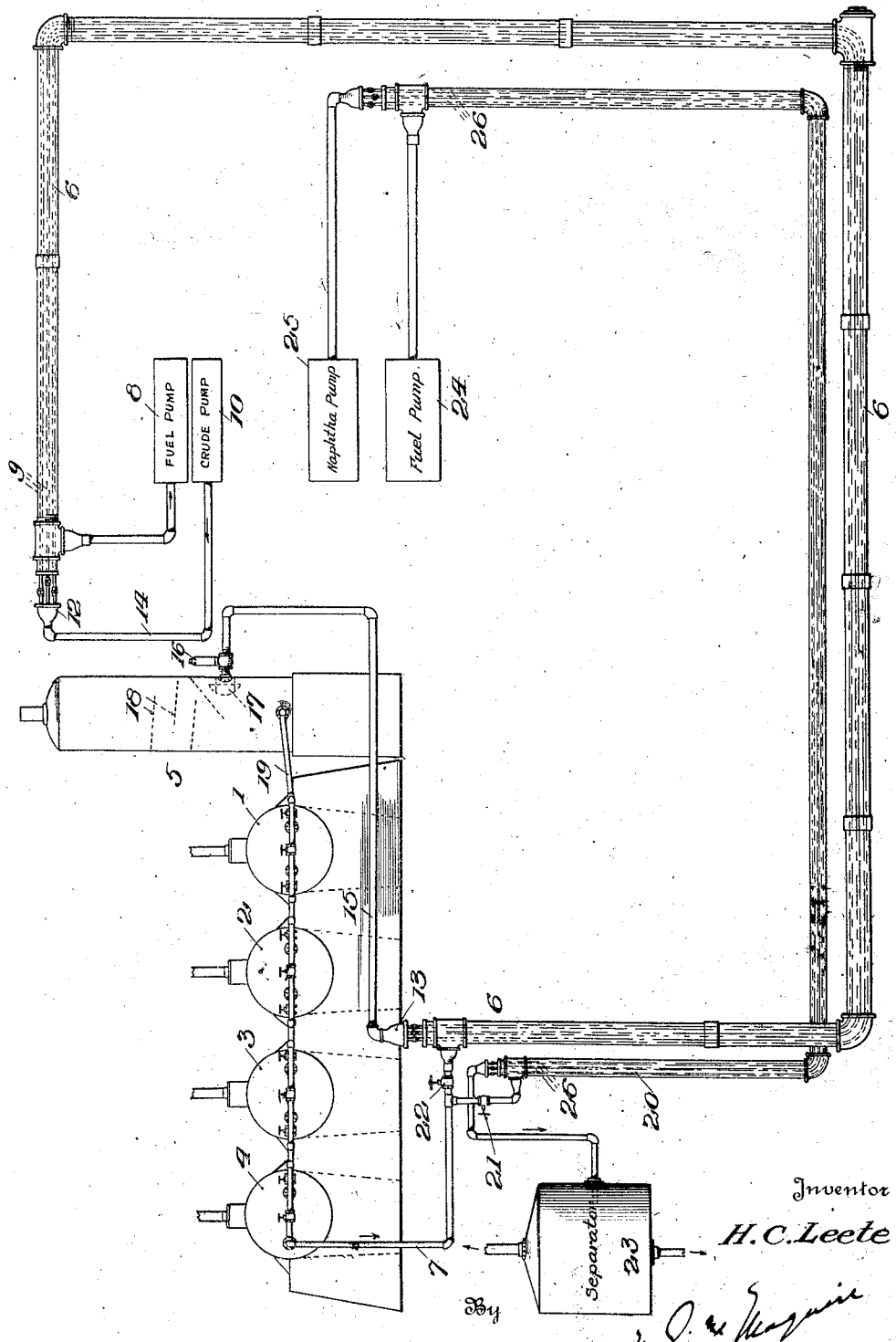

ns of the page.

UNITED STATES PATENT OFFICE.

HORACE C. LEETE, OF CUSHING, OKLAHOMA.

OIL-REFINING APPARATUS.

1,288,934. Specification of Letters Patent. Patented Dec. 24, 1918.

Application filed November 24, 1917. Serial No. 203,690.

*To all whom it may concern:*

Be it known that I, HORACE C. LEETE, of Cushing, in the county of Payne and State of Oklahoma, have invented certain new and useful improvements in Oil-Refining Apparatus; and I do hereby declare the following to be a full, clear, and exact description of the invention, such as will enable others skilled in the art to which it appertains to make and use the same.

My object is to provide improved means for separating gasolene from crude oil and utilizing the heat obtained, and saving fuel oil and gas and increasing capacity. The preferred form of embodiment of my invention is conventionally illustrated in the accompanying drawing.

As illustrated, 1, 2, 3 and 4 are stills, still 1 being supplied with crude oil from a separator 5.

A heater pipe 6 is shown connected at one end with a pipe 7 leading from still 4 and at the other end with a fuel pump 8. A valve 22 is shown in pipe 7. Inside of pipe 6 is shown a series of tubes 9 leading from a crude oil pump 10 to separator 5. More specifically the tubes 9 enter manifolds 12 and 13 which, by single pipes 14, 15, are connected, respectively, with the crude oil pump 10 and separator 5.

The separator 5 is adapted for connection with a condenser and it is shown receiving the pipe 15, a pop valve 16 being arranged in the pipe outside of the separator and normally set at 60 to 70 lbs. Inside the separator at the point of introduction of pipe 15 is arranged a concaved deflecting pan 17. Above this pan and in line toward the exit to the condenser is a series of baffle plates 18. 19 is the pipe leading from the separator to still 1.

In operation the suction pump 8 draws the fuel from still 4 at about 600° F. through pipes 7 and 6. At the same time the pump 10 forces crude oil through pipe 14 and tubes 9 and pipe 15 to the separator 5. During its passage through tubes 9 the oil is heated to about 500° F. by the heat given up to it by the fuel in pipe 6 and the fuel is correspondingly cooled. When the oil reaches valve 16 under about 60 lbs. pressure and is admitted to the separator 5 and contacts with pan 17, the crude oil is atomized and in passing in contact with the baffle plates the heavier fuel is separated from the gasolene which passes off to a condenser.

The reduced crude oil then passes from the separator through pipe 19 to still 1. No separate heating means is required for the separator. But little heat is necessary in stills 1, 2 and 3. Still 4 requires the greatest heat.

It will be noted that the maximum efficiency of the heat is thus made use of; that the fuel oil is cooled down while the crude oil is being heated, thus insuring an economy of heat and an increase in production of gasolene. I attribute special importance to the atomizing action effected by the pan 17.

At 20 I have shown what I term an equalizer. This may be constructed like the heater pipe 6 and is shown in the form of a pipe in communication with pipe 7 and controlled by valve 21. This equalizer may receive a portion of the oil from still 4 and thereby regulate the heat entering the heater 6 and thus control the gravity of the gasolene and benzene leaving the separator 5 in the form of a vapor. 23 is the separator which is included in the equalizer system and, like separator 5, may lead to a condenser. 24 is a fuel pump to which pipe 20 leads and 25 is a naphtha pump from which tubes 26 pass through pipe 20, similar to the relative arrangement of tubes 9 and pipe 6. The equalizer thus performs two functions. It governs the oil fed to the heater pipe 6, and it utilizes what would be excess heat in 6 for distilling naphthas and light oils.

I claim as my invention:

1. In an oil separator, a still, a suction pump, a pipe conducting oil from said still to said pump, a separator, a plurality of tubes within said pipe and extending throughout the length thereof, and a single pipe leading from said tubes to said separator.

2. In an oil separator, a still, a suction pump, a pipe conducting oil from said still to said pump, a separator, tubes within said pipe for conducting crude oil, a pipe communicating with said tubes and leading to said separator, and a series of baffle plates in said separator above the point of introduction of said latter pipe.

3. In an oil separator, a still, a suction pump, a heater pipe conducting oil from said still to said pump, a separator, tubes within said pipe for conducting crude oil to said separator, and an equalizer pipe adapted to communicate with the oil supply from said still to said heater pipe to govern the oil flow.

4. In an oil separator, a still, a suction pump, a heater pipe conducting oil from said still to said pump, a separator, tubes within said pipe for conducting crude oil to said separator, and an equalizer pipe adapted to communicate with the oil supply from said still to said heater pipe to govern the oil flow, a light oil pump and separator, and means for heating the light oil in its travel from the pump to the separator by the heat contained in said equalizer pipe.

In testimony whereof, I have signed this specification.

HORACE C. LEETE.